(12) United States Patent
Zolock et al.

(10) Patent No.: US 7,651,263 B2
(45) Date of Patent: Jan. 26, 2010

(54) METHOD AND APPARATUS FOR MEASURING THE TEMPERATURE OF A GAS IN A MASS FLOW CONTROLLER

(75) Inventors: Michael John Zolock, Berthoud, CO (US); Hiroyuki Ito, Akigawa (JP)

(73) Assignee: Advanced Energy Industries, Inc., Fort Collins, CO (US)

( * ) Notice: Subject to any disclaimer, the term of this patent is extended or adjusted under 35 U.S.C. 154(b) by 231 days.

(21) Appl. No.: 11/680,785

(22) Filed: Mar. 1, 2007

(65) Prior Publication Data

US 2008/0211510 A1     Sep. 4, 2008

(51) Int. Cl.
G01K 3/00 (2006.01)
G01K 15/00 (2006.01)
G01K 7/00 (2006.01)
G01K 13/02 (2006.01)
G01F 1/68 (2006.01)

(52) U.S. Cl. .......... 374/110; 374/183; 374/1; 374/166; 374/170; 374/138; 73/202.5; 73/204.11

(58) Field of Classification Search .......... 374/138, 374/170, 166, 183, 110, 1; 73/202.5, 204.11
See application file for complete search history.

(56) References Cited

U.S. PATENT DOCUMENTS

| | | | |
|---|---|---|---|
| 3,683,692 A * | 8/1972 | Lafitte | 73/202.5 |
| 4,418,568 A | 12/1983 | Surman | |
| 4,461,173 A * | 7/1984 | Olin | 73/202.5 |
| 4,475,387 A * | 10/1984 | Hawk et al. | 73/202.5 |
| 4,658,855 A | 4/1987 | Doyle | |
| 4,685,331 A | 8/1987 | Renken | |
| 5,279,154 A | 1/1994 | Vavra | |
| 5,587,520 A * | 12/1996 | Rhodes | 73/25.03 |
| 5,944,048 A * | 8/1999 | Bump et al. | 137/487.5 |
| 6,044,701 A | 4/2000 | Doyle | |

(Continued)

OTHER PUBLICATIONS

ISA/US, International Search Report, Sep. 8, 2008, USA.

(Continued)

*Primary Examiner*—Gail Verbitsky
*Assistant Examiner*—Mirellys Jagan
(74) *Attorney, Agent, or Firm*—Sean R. O'Dowd; Neugeboren O'Dowd PC

(57) ABSTRACT

A method and apparatus for measuring the temperature of a gas in a mass flow controller is described. One embodiment derives gas-temperature information from a mass flow sensor of the mass flow controller without relying on a separate temperature sensor. This embodiment supplies a substantially constant electrical current to a thermal mass flow sensor of the mass flow controller, the thermal mass flow sensor being designed to measure a mass flow rate of the gas; measures an input voltage of the thermal mass flow sensor to obtain a present input voltage, the input voltage varying with a temperature differential between a pair of sensing elements of the thermal mass flow sensor; calculates an adjusted input voltage by accounting for a component of the present input voltage that is dependent on the mass flow rate of the gas; and calculates the temperature of the gas based on the adjusted input voltage. In some embodiments, the calculated gas temperature is used to compensate for the variation, with temperature, of an output voltage of the thermal mass flow sensor under a zero-flow condition.

19 Claims, 7 Drawing Sheets

U.S. PATENT DOCUMENTS

| | | |
|---|---|---|
| 6,216,726 B1 | 4/2001 | Brown |
| 6,289,746 B1 | 9/2001 | Fu |
| 6,354,150 B1 | 3/2002 | Rudent |
| 6,360,772 B1 | 3/2002 | Wu |
| 6,389,364 B1 | 5/2002 | Vyers |
| 6,647,776 B2 | 11/2003 | Kohmura |
| 6,725,166 B1 | 4/2004 | Luchner |
| 6,779,394 B2 | 8/2004 | Ambrosina |
| 6,826,953 B2 | 12/2004 | Wang |
| 6,918,295 B1 | 7/2005 | Shajii et al. |
| 6,962,164 B2 | 11/2005 | Lull et al. |
| 7,000,463 B1 | 2/2006 | Shajii et al. |
| 7,000,465 B1 * | 2/2006 | L'Bassi et al. ........... 73/204.27 |
| 7,107,834 B2 | 9/2006 | Meneghini et al. |
| 7,136,767 B2 | 11/2006 | Shajii et al. |
| 7,216,534 B2 | 5/2007 | Masuichi |
| 2003/0115949 A1 | 6/2003 | Ambrosia et al. |
| 2004/0163712 A1 | 8/2004 | Gill |
| 2005/0087011 A1 * | 4/2005 | Vincze et al. ............ 73/204.26 |
| 2006/0059987 A1 | 3/2006 | Melville et al. |
| 2007/0113641 A1 | 5/2007 | Ding et al. |

OTHER PUBLICATIONS

ISA/US, Written Opinion of the International Searching Authority, Sep. 8, 2008, USA.

* cited by examiner

METHOD AND APPARATUS FOR MEASURING THE TEMPERATURE OF A GAS IN A MASS FLOW CONTROLLER

FIELD OF THE INVENTION

The present invention relates generally to mass flow controllers. In particular, but not by way of limitation, the present invention relates to methods and apparatuses for measuring the temperature of a gas in a mass flow controller.

BACKGROUND OF THE INVENTION

A typical mass flow controller (MFC) is a closed-loop device that sets, measures, and controls the flow of a gas in industrial processes such as thermal and dry etching. An important part of a MFC is a sensor that measures the mass flow rate of the gas flowing through the device. The MFC compares an output signal from the sensor with a predetermined set point and adjusts a control valve to maintain the mass flow rate of the gas at the predetermined set point.

Some characteristics of a MFC tend to drift with temperature. For example, the mass flow sensor output when no gas is flowing through the device may vary with temperature, a phenomenon referred to as "zero shift." If the temperature of the gas flowing through the MFC is known, the MFC can compensate for temperature-dependent inaccuracies such as zero shift. Thus, to make the performance of a MFC less sensitive to temperature, it is desirable for the MFC to be able to measure the gas temperature. Adding a temperature sensor to a MFC increases its complexity and cost, however.

It is thus apparent that there is a need in the art for an improved method and apparatus for measuring the temperature of a gas in a MFC.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and apparatus for measuring the temperature of a gas in a mass flow controller. One illustrative embodiment is a method, comprising supplying a substantially constant electrical current to a thermal mass flow sensor of the mass flow controller, the thermal mass flow sensor being designed to measure a mass flow rate of the gas; measuring an input voltage of the thermal mass flow sensor to obtain a present input voltage, the input voltage varying with a temperature differential between a pair of sensing elements of the thermal mass flow sensor; calculating an adjusted input voltage by accounting for a component of the present input voltage that is dependent on the mass flow rate of the gas; and calculating the temperature of the gas based on the adjusted input voltage.

Another illustrative embodiment is a temperature-measurement subsystem to measure the temperature of a gas in a mass flow controller, the temperature-measurement subsystem comprising a thermal mass flow sensor including a pair of sensing elements, the thermal mass flow sensor being designed to measure a mass flow rate of a gas flowing through the mass flow controller, an input voltage of the thermal mass flow sensor varying with a temperature differential between the pair of sensing elements; a current source configured to supply a substantially constant electrical current to the thermal mass flow sensor; and control logic configured to measure the input voltage of the thermal mass flow sensor to obtain a present input voltage, calculate an adjusted input voltage by accounting for a component of the present input voltage that is dependent on the mass flow rate of the gas, and calculate the temperature of the gas based on the adjusted input voltage.

Another illustrative embodiment is a mass flow controller, comprising a thermal mass flow sensor designed to measure a mass flow rate of a gas flowing through the mass flow controller, the thermal mass flow sensor including a pair of sensing elements, an input voltage of the thermal mass flow sensor varying with a temperature differential between the pair of sensing elements; a current source configured to supply a substantially constant electrical current to the thermal mass flow sensor; a bypass including main-flow and sensor paths through which the gas can flow; a control valve to control the mass flow rate of the gas through the bypass; mass-flow control logic configured to compare with a predetermined set point the mass flow rate of the gas as measured by the thermal mass flow sensor and to adjust the control value to maintain the mass flow rate of the gas at the predetermined set point; and temperature-measurement control logic configured to measure the input voltage of the thermal mass flow sensor to obtain a present input voltage, calculate an adjusted input voltage by accounting for a component of the present input voltage that is dependent on the mass flow rate of the gas, and calculate the temperature of the gas based on the adjusted input voltage.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

In an illustrative embodiment of the invention, the additional expense and complexity of a separate temperature sensor in a mass flow controller (MFC) is avoided by deriving gas temperature measurements from the mass-flow-rate sensor already present in the MFC. The gas-temperature information can be used to compensate for zero shift and otherwise improve the temperature insensitivity of the MFC.

Figure 1:
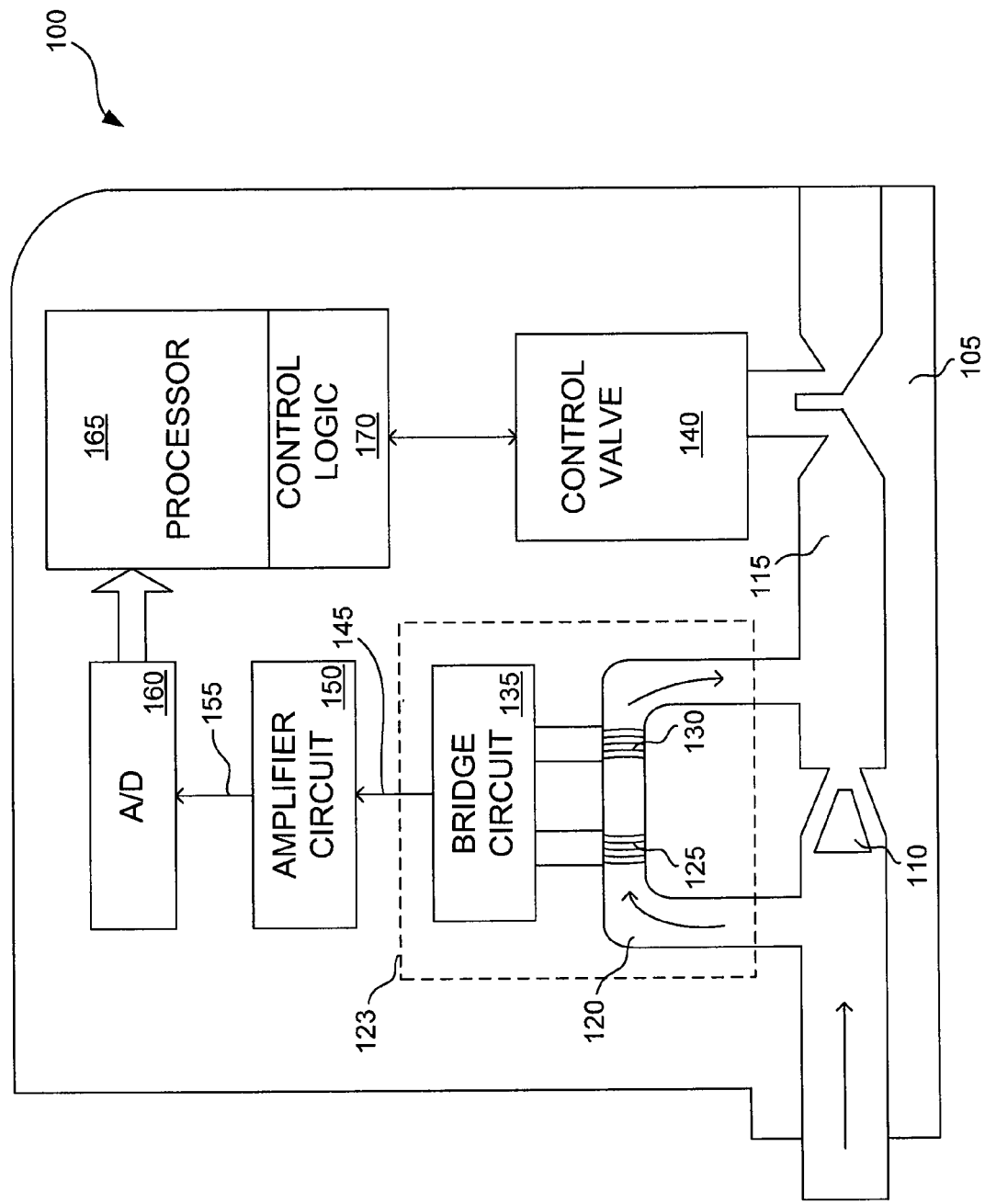
FIG. 1 is a functional block diagram of a mass flow controller in accordance with an illustrative embodiment of the invention.

Referring now to the drawings, where like or similar elements are designated with identical reference numerals throughout the several views where appropriate, and referring in particular to FIG. 1, it is a functional block diagram of a MFC 100 in accordance with an illustrative embodiment of the invention. In some embodiments, MFC 100 is a pressure-insensitive mass flow controller (PIMFC). Base 105 of MFC 100 includes bypass 110 through which a gas flows. Bypass 110 directs a constant proportion of gas through main path 115 and sensor tube 120. Sensor tube 120, a small bore tube in this embodiment, is part of a thermal mass flow sensor 123 of MFC 100. Sensing elements 125 and 130 are wound around the outside of sensor tube 120. In one illustrative embodiment, sensing elements 125 and 130 are resistance-thermometer elements. The electrical resistance of sensing elements 125 and 130 varies with temperature.

Sensing elements 125 and 130 are electrically connected with bridge circuit 135. A current source (not shown in FIG. 1) supplies sensing elements 125 and 130 with a substantially constant electrical current, resulting in the heating of sensor tube 120. The gas flow through sensor tube 120 causes heat to be transferred from the upstream sensing element 125 to the downstream sensing element 130. The change in resistance due to this temperature differential produces a measurable output voltage in bridge circuit 135 (not shown in FIG. 1).

Though not shown in FIG. 1, the output voltage of bridge circuit 135 is amplified and fed to a comparator, processor, or other control circuit that controls the operation of control valve 140. MFC 100 compares the output voltage of bridge circuit 135 with a specified mass-flow-rate set point and adjusts control valve 140 to maintain the specified set point. The output voltage of bridge circuit 135 will sometimes be referred to herein as the output voltage of thermal mass flow sensor 123.

The input (excitation) voltage 145 of bridge circuit 135 varies with the temperature differential between sensing elements 125 and 130 in an approximately proportional manner. Input voltage 145 will sometimes be referred to herein as the input voltage of thermal mass flow sensor 123. In this embodiment, input voltage 145 is fed to amplifier circuit 150, and the amplified input voltage 155 is fed to analog-to-digital (A/D) converter 160. A/D converter 160 converts the amplified input voltage 155 to a digital number that is read and processed by processor 165 in accordance with control logic 170. In some embodiments, control logic 170 is stored in a built-in flash memory of processor 165. In general, the functionality of processor 165 and control logic 170 can be implemented in hardware, firmware, software, or any combination thereof.

Control logic 170 is configured to measure input voltage 145, calculate an adjusted input voltage by accounting for a component of the measured input voltage that is dependent on the mass flow rate of the gas, and calculate the temperature of the gas based on the adjusted input voltage. Once the temperature of the gas is known, control logic 170, in some embodiments, compensates for the variation, with temperature, of the output voltage of thermal mass flow sensor 123 under a zero-flow condition based on the calculated gas temperature. That is, control logic 170 is configured, in some embodiments, to compensate for zero shift in MFC 100 based on the temperature information derived from thermal mass flow sensor 123.

In practice, the temperature of base 105 is what is actually measured, but experience has shown that the difference between the temperature of a gas flowing through MFC 100 and that of base 105 is negligible. Therefore, the techniques described in this Detailed Description can be used to measure accurately the temperature of the gas itself.

Figure 2:
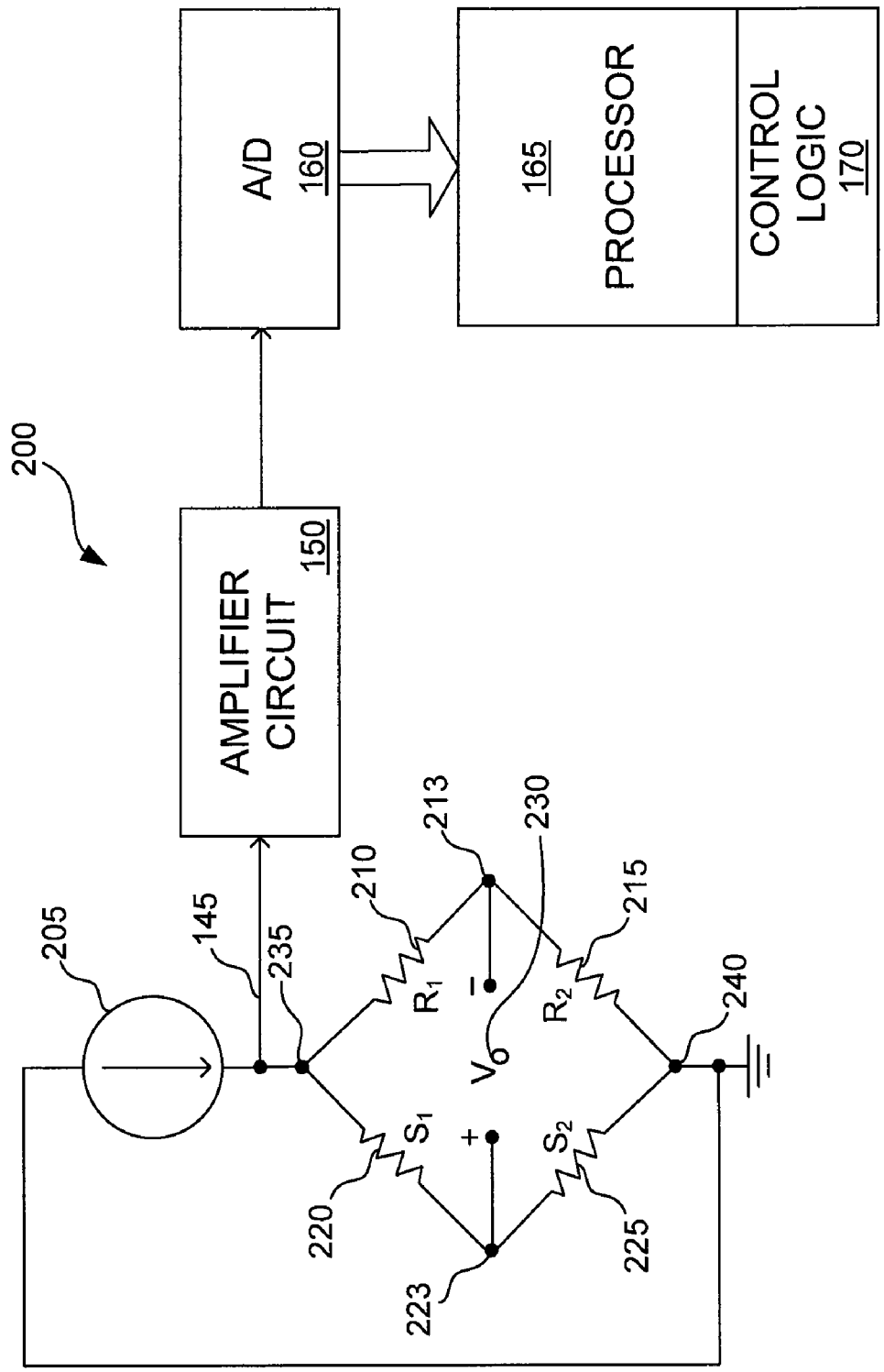
FIG. 2 is a functional block diagram of a temperature-measurement subsystem to measure the temperature of a gas in a mass flow controller in accordance with an illustrative embodiment of the invention.

FIG. 2 is a functional block diagram of a temperature-measurement subsystem 200 to measure the temperature of a gas in a MFC in accordance with an illustrative embodiment of the invention. In FIG. 2, current source 205 supplies a substantially constant electrical current to bridge circuit 135, shown in FIG. 2 as the well-known Wheatstone bridge. Bridge circuit 135 includes four nodes (235, 213, 240, and 223) between which elements are connected. Among those elements are two fixed resistive elements 210 and 215 ($R_1$ and $R_2$, respectively). In one illustrative embodiment, fixed resistive elements 210 and 215 are both 10 k-ohm precision resistors. The temperature-dependent resistances associated with sensing elements 125 and 130 in FIG. 1 are shown in FIG. 2 as resistances 220 and 225 ($S_1$ and $S_2$), respectively. Those skilled in the art will notice that sensing elements 125 and 130 have one node, node 223, in common.

As explained above, output voltage 230 is used in measuring the mass flow rate through MFC 100 to control the operation of control valve 140. In this illustrative embodiment, output voltage 230 is the electrical potential of node 223 with respect to node 213. The details of how output voltage 230 is amplified and processed are not shown in FIG. 2 to provide a clearer focus on the use of input voltage 145 of thermal mass flow sensor 123 for the measurement of gas temperature.

Input voltage 145, the electrical potential of node 235 with respect to node 240, is used by control logic 170 in calculating the temperature of a gas in MFC 100, as explained above. Further detail regarding the calculation of the gas temperature from input voltage 145 is provided below.

Figure 3:
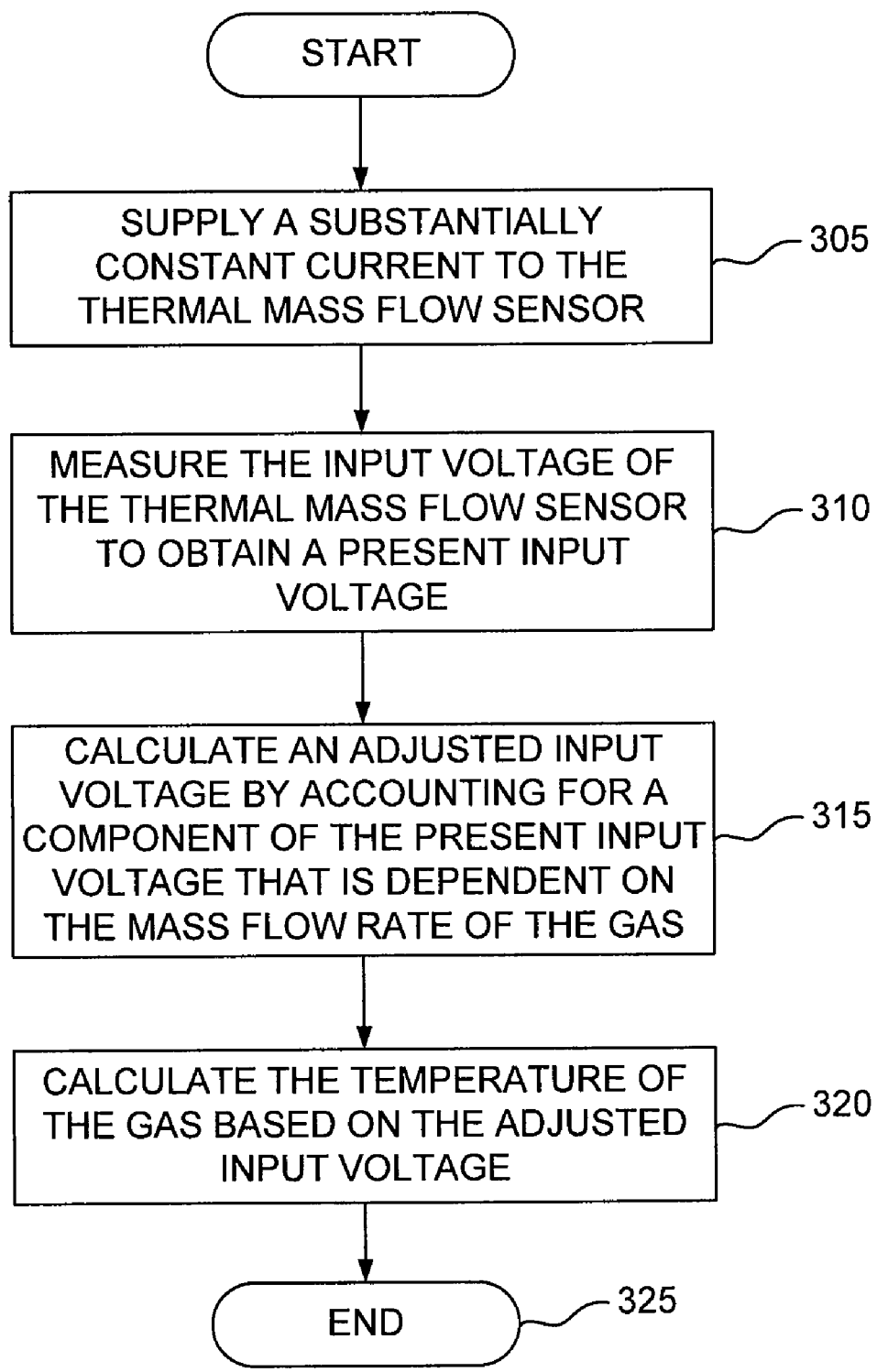
FIG. 3 is a flowchart of a method for measuring the temperature of a gas in a mass flow controller in accordance with an illustrative embodiment of the invention.

FIG. 3 is a flowchart of a method for measuring the temperature of a gas in a MFC in accordance with an illustrative embodiment of the invention. At 305, current source 205 supplies a substantially constant electrical current to thermal mass flow sensor 123. At 310, control logic 170 measures input voltage 145 of thermal mass flow sensor 123 to obtain a present input voltage. At 315, control logic 170 calculates an adjusted input voltage by accounting for a component of the present input voltage that is dependent on the mass flow rate of the gas flowing through MFC 100. At 320, control logic 170 calculates the temperature of the gas based on the adjusted input voltage. The process terminates at 325.

Figure 4:
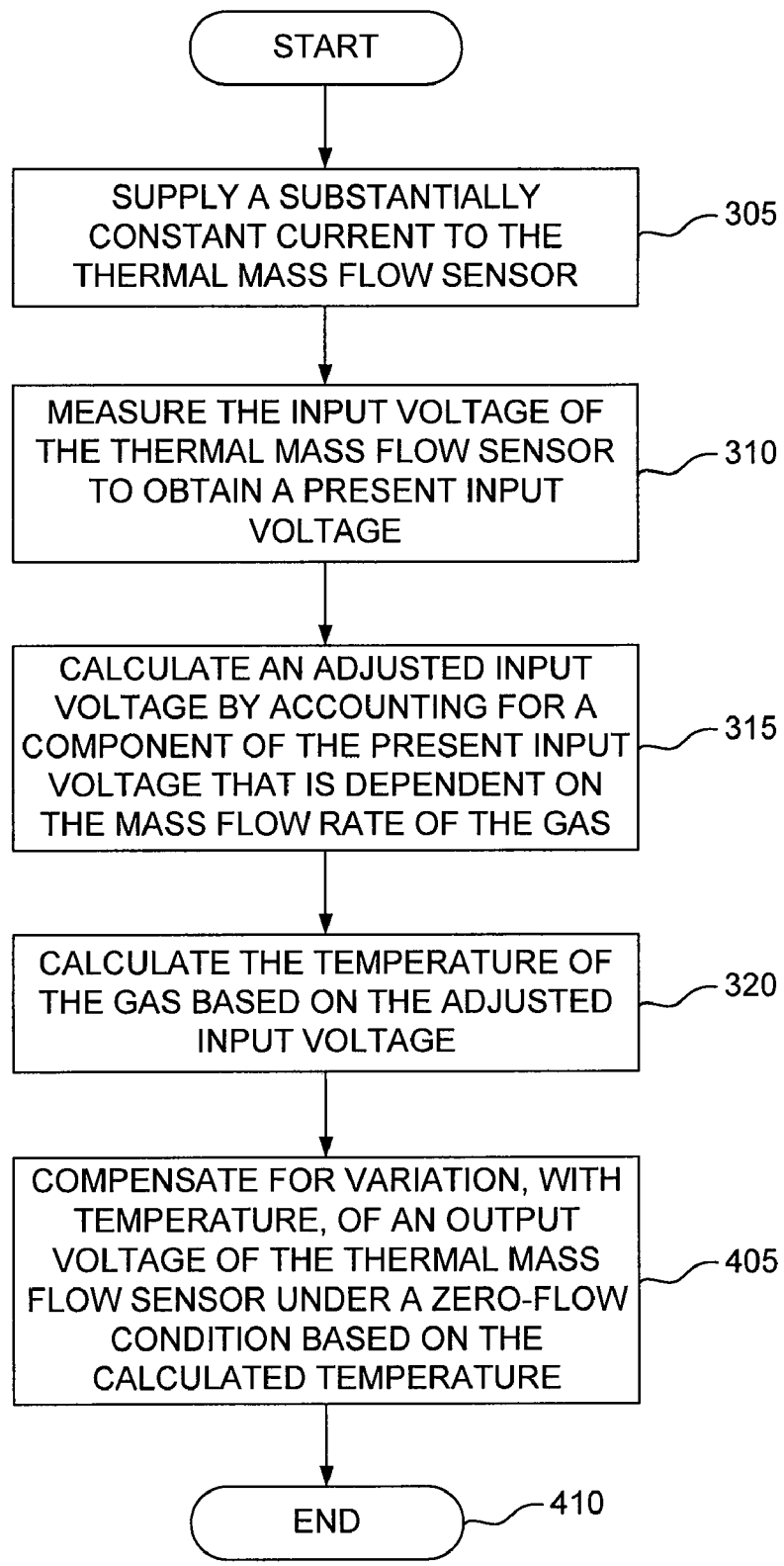
FIG. 4 is a flowchart of a method for measuring the temperature of a gas in a mass flow controller in accordance with another illustrative embodiment of the invention.

FIG. 4 is a flowchart of a method for measuring the temperature of a gas in a MFC in accordance with another illustrative embodiment of the invention. In the embodiment of FIG. 4, the method proceeds as shown in FIG. 3 through Block 320. At 405, control logic 170 compensates for variation, with temperature, of output voltage 230 of thermal mass flow sensor 123 under a zero-flow condition (zero shift) based on the gas temperature calculated at 320. At 410, the process terminates.

Figure 5A:
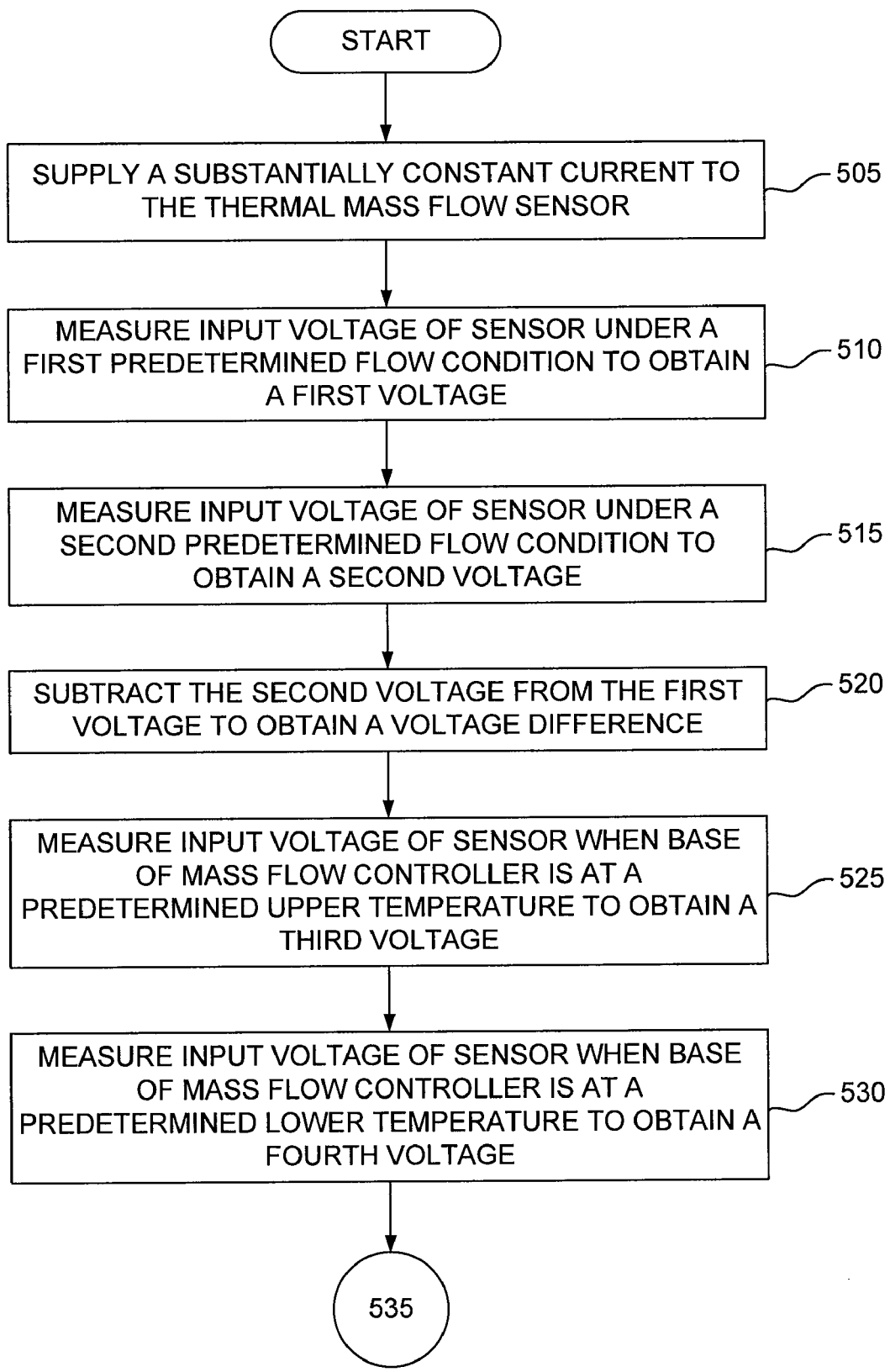
FIGS. 5A-5C are flowcharts of methods for measuring the temperature of a gas in a mass flow controller in accordance with other illustrative embodiments of the invention.
Figure 5B:
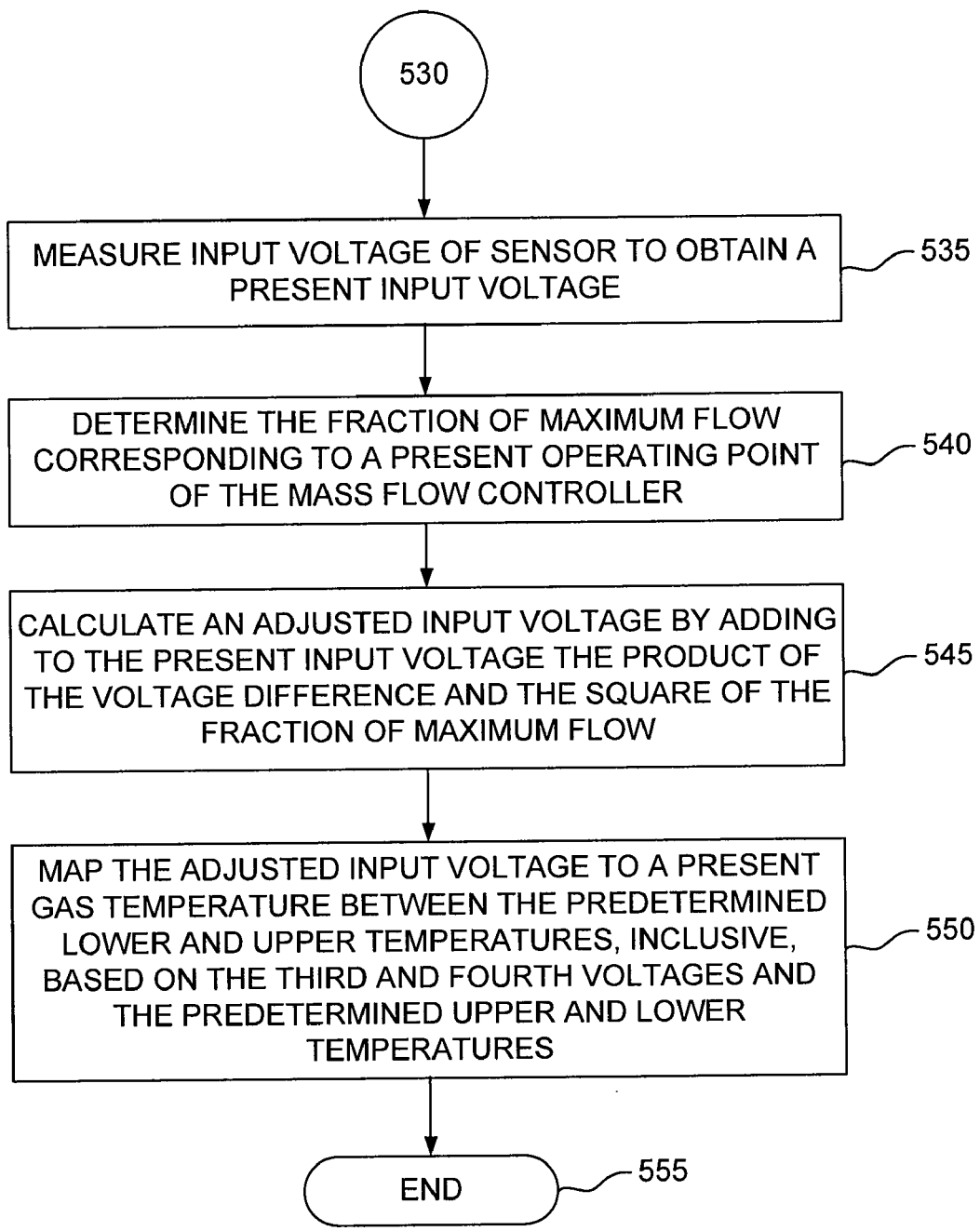
Figure 5C:
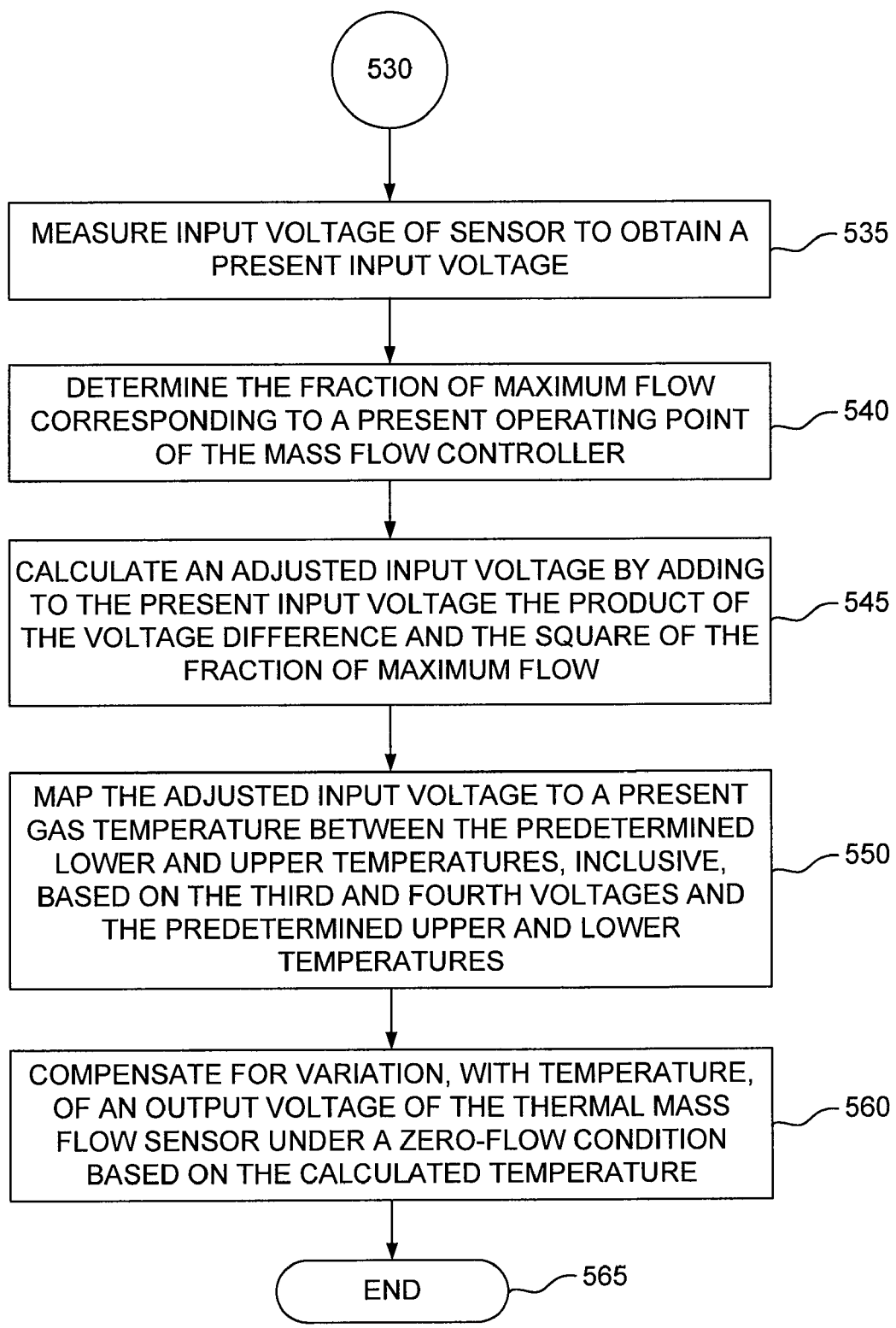

FIGS. 5A-5C are flowcharts of methods for measuring the temperature of a gas in a MFC in accordance with other illustrative embodiments of the invention.

Consider first FIG. 5A. At 505, current source 205 supplies a substantially constant electrical current to thermal mass flow sensor 123. At 510, control logic 170 measures input voltage 145 of thermal mass flow sensor 123 under a first predetermined flow condition to obtain a first voltage $V_1$. In one embodiment, the first predetermined flow condition is a zero-flow condition (i.e., no gas is flowing through MFC 100). At 515, control logic 170 measures input voltage 145 under a second predetermined flow condition to obtain a second voltage $V_2$. In one embodiment, the second predetermined flow condition is a maximum (100 percent) flow condition.

At 520, control logic 170 subtracts the second voltage from the first voltage to obtain a voltage difference $\Delta V = V_1 - V_2$. At 525, control logic 170 measures input voltage 145 when base 105 of MFC 100 is at a predetermined upper temperature Tu to obtain a third voltage $V_3$. In one embodiment, the predetermined upper temperature is 55° C. At 530, control logic 170 measures input voltage 145 when base 105 of MFC 100 is at a predetermined lower temperature $T_L$ to obtain a fourth voltage $V_4$. In one embodiment, the predetermined lower temperature is 35° C.

Those skilled in the art will recognize that Blocks 510-530 in FIG. 5A can be performed in advance and that $V_1$, $V_2$, $V_3$, $V_4$, $T_U$, and $T_L$ can be stored in a memory for later use in calculating the gas temperature.

Consider next FIG. 5B. At 535, control logic 170 measures input voltage 145 to obtain a present (current) input voltage $V_P$. At 540, control logic 170 determines the fraction of maximum flow (FMF) corresponding to the present operating point of MFC 100. For example, if MFC 100 is currently operating at 80 percent of its maximum mass flow rate, the corresponding fraction of maximum flow or FMF would be 0.8.

At 545, control logic 170 calculates an adjusted input voltage $V_A$ for thermal mass flow sensor 123 as follows:

$$V_A = V_P + \Delta V \cdot (FMF)^2.$$

At 550, control logic 170 maps the adjusted input voltage $V_A$ to a corresponding gas temperature $T_G$ between $T_L$ and $T_U$, inclusive, based on $V_3$, $V_4$, $T_U$, and $T_L$. In one embodiment, the mapping is performed in accordance with the following linear relationship:

$$T_G = (V_A - V_4)/m + T_L,$$

where $m = (V_3 - V_4)/(T_U - T_L)$.

Finally, consider FIG. 5C. In this illustrative embodiment, the method proceeds as in FIG. 5A through Block 530 and as in FIG. 5B through Block 550. At 560, control logic 170 compensates for the variation, with temperature, of output voltage 230 of thermal mass flow sensor 123 under a zero-flow condition, otherwise known as zero shift, based on the calculated gas temperature $T_G$.

In one illustrative embodiment, the temperature $T_z$ of base 105 when the mass flow is zero is measured and recorded. The output voltage 230 under a zero-flow condition at temperature $T_U$, $V_{ZU}$, and the output voltage 230 under a zero-flow condition at temperature $T_L$, $V_{ZL}$, are also measured and recorded. The output voltage 230 $V_Z$ corresponding to zero flow can then be updated by adding the following quantity to the already-stored $V_Z$ and storing the result as the new $V_Z$:

$$(T_G - T_z) \cdot \rho,$$

where $\rho = (V_{ZU} - V_{ZL})/(T_U - T_L)$.

At 565, the process in FIG. 5C terminates.

In some embodiments, the above calculations are performed in the digital domain by processor 165. In such embodiments, input voltage 145 and output voltage 230 are digitized, and the above calculations are performed in terms of "counts" of A/D converter 160. For example, in a digital implementation, the slope m given above corresponds to the counts per degree Celsius in the calculation of $T_G$. Likewise, in a digital implementation, the slope $\rho$ above corresponds to the counts per degree Celsius in the updating of $V_Z$.

Those skilled in the art will recognize that a desired temperature-measurement accuracy can be achieved by properly scaling the amplified input voltage 155 that is fed to A/D converter 160 and by choosing an A/D converter 160 with sufficient resolution. In one embodiment, the counts per degree Celsius is in the range of 5 to 7. Those skilled in the art will also recognize that the above description can be adapted to temperatures measured in Fahrenheit degrees instead of Celsius degrees.

In some digital implementations, voltages are measured by taking multiple samples (e.g., 100) and averaging the samples.

The effects of a change in gas pressure on the calculation of temperature as described above can be corrected using a long-time filter. Changes in the temperature of base 105 due to ambient conditions can also be compensated for using a long-time filter having a time constant of, for example, 5 to 10 seconds.

In conclusion, the present invention provides, among other things, a method and apparatus for measuring the temperature of a gas in a mass flow controller. Those skilled in the art can readily recognize that numerous variations and substitutions may be made in the invention, its use, and its configuration to achieve substantially the same results as achieved by the embodiments described herein. Accordingly, there is no intention to limit the invention to the disclosed illustrative forms. Many variations, modifications, and alternative constructions fall within the scope and spirit of the disclosed invention as expressed in the claims.

What is claimed is:

1. A method for measuring the temperature of a gas in a mass flow controller, the method comprising:
   supplying a substantially constant electrical current to a thermal mass flow sensor of the mass flow controller, the thermal mass flow sensor being designed to measure a mass flow rate of the gas;
   measuring an input voltage of the thermal mass flow sensor to obtain a present input voltage, the input voltage varying with a temperature differential between a pair of sensing elements of the thermal mass flow sensor;
   calculating an adjusted input voltage by accounting for a component of the present input voltage that is dependent on the mass flow rate of the gas; and
   calculating the temperature of the gas based on the adjusted input voltage.

2. The method of claim 1, further comprising:
   compensating for variation, with temperature, of an output voltage of the thermal mass flow sensor under a zero-flow condition based on the calculated temperature.

3. The method of claim 1, wherein the input voltage is fed to an analog-to-digital (A/D) converter and the present input voltage is obtained as a digital number from an output of the (A/D) converter.

4. The method of claim 1, wherein calculating an adjusted input voltage by accounting for a component of the present input voltage that is dependent on the mass flow rate of the gas includes:
   prior to measuring the input voltage to obtain the present input voltage:
   measuring the input voltage under a first predetermined flow condition to obtain a first voltage; and
   measuring the input voltage under a second predetermined flow condition to obtain a second voltage;
   subtracting the second voltage from the first voltage to obtain a voltage difference;
   determining a fraction of maximum flow corresponding to a present operating point of the mass flow controller; and calculating the adjusted input voltage by adding to the present input voltage the product of the voltage difference and the square of the fraction of maximum flow.

5. The method of claim 4, wherein the first predetermined flow condition is a zero-flow condition and the second predetermined flow condition is a maximum-flow condition.

6. The method of claim 1, wherein calculating the temperature of the gas based on the adjusted input voltage includes:
   prior to measuring the input voltage to obtain the present input voltage:
      measuring the input voltage when a base of the mass flow controller is at a predetermined upper temperature to obtain a first voltage; and
      measuring the input voltage when the base of the mass flow controller is at a predetermined lower temperature to obtain a second voltage; and
   mapping the adjusted input voltage to a temperature between the predetermined lower and upper temperatures, inclusive, based on the first and second voltages and the predetermined upper and lower temperatures.

7. The method of claim 6, wherein the mapping is linear.

8. A temperature-measurement subsystem to measure the temperature of a gas in a mass flow controller, the temperature-measurement subsystem comprising:
   a thermal mass flow sensor including a pair of sensing elements, the thermal mass flow sensor being designed to measure a mass flow rate of a gas flowing through the mass flow controller, an input voltage of the thermal mass flow sensor varying with a temperature differential between the pair of sensing elements;
   a current source configured to supply a substantially constant electrical current to the thermal mass flow sensor; and
   control logic configured to:
      measure the input voltage of the thermal mass flow sensor to obtain a present input voltage;
      calculate an adjusted input voltage by accounting for a component of the present input voltage that is dependent on the mass flow rate of the gas; and
      calculate the temperature of the gas based on the adjusted input voltage.

9. The temperature-measurement subsystem of claim 8, wherein the control logic is configured to compensate for variation, with temperature, of an output voltage of the thermal mass flow sensor under a zero-flow condition based on the calculated temperature.

10. The temperature-measurement subsystem of claim 8, further comprising:
    an amplifier that amplifies the input voltage to produce an amplified input voltage; and
    an analog-to-digital converter to convert the amplified input voltage to a digital number.

11. The temperature-measurement subsystem of claim 8, wherein the thermal mass flow sensor includes:
    a tube through which a substantially constant proportion of the gas flows when a gas is flowing through the mass flow controller;
    first and second resistance-thermometer elements wound around the outside of the tube at first and second locations along the tube, respectively; and
    a bridge circuit having first, second, third, and fourth nodes, a first predetermined resistive component being connected between the first and second nodes, a second predetermined resistive component being connected between the second and third nodes, the first resistance-thermometer element being connected between the first and fourth nodes, the second resistance-thermometer element being connected between the fourth and third nodes.

12. The temperature-measurement subsystem of claim 8, wherein the third node is at a predetermined reference electrical potential and the input voltage is measured at the first node with respect to the third node.

13. The temperature-measurement subsystem of claim 8, wherein the control logic includes stored program instructions executable by a processor.

14. The temperature-measurement subsystem of claim 8, wherein, in calculating the adjusted input voltage, the control logic is configured to:
    measure the input voltage under a first predetermined flow condition to obtain a first voltage prior to measuring the input voltage to obtain the present input voltage;
    measure the input voltage under a second predetermined flow condition to obtain a second voltage prior to measuring the input voltage to obtain the present input voltage;
    subtract the second voltage from the first voltage to obtain a voltage difference;
    determine a fraction of maximum flow corresponding to a present operating point of the mass flow controller; and
    calculate the adjusted input voltage by adding to the present input voltage the product of the voltage difference and the square of the fraction of maximum flow.

15. The temperature-measurement subsystem of claim 14, wherein the first predetermined flow condition is a zero-flow condition and the second predetermined flow condition is a maximum-flow condition.

16. The temperature-measurement subsystem of claim 8, wherein, in calculating the temperature of the gas, the control logic is configured to:
    measure the input voltage when a base of the mass flow controller is at a predetermined upper temperature to obtain a first voltage prior to measuring the input voltage to obtain the present input voltage;
    measure the input voltage when the base of the mass flow controller is at a predetermined lower temperature to obtain a second voltage prior to measuring the input voltage to obtain the present input voltage; and
    map the adjusted input voltage to a temperature between the predetermined lower and upper temperatures, inclusive, based on the first and second voltages and the predetermined upper and lower temperatures.

17. The temperature-measurement subsystem of claim 16, wherein the control logic is configured to map linearly the adjusted input voltage to a temperature between the predetermined lower and upper temperatures, inclusive.

18. A mass flow controller, comprising:
    a thermal mass flow sensor designed to measure a mass flow rate of a gas flowing through the mass flow controller, the thermal mass flow sensor including a pair of sensing elements, an input voltage of the thermal mass flow sensor varying with a temperature differential between the pair of sensing elements;
    a current source configured to supply a substantially constant electrical current to the thermal mass flow sensor;
    a bypass including main-flow and sensor paths through which the gas can flow;
    a control valve to control the mass flow rate of the gas through the bypass;
    mass-flow control logic configured to:
       compare with a predetermined set point the mass flow rate of the gas as measured by the thermal mass flow sensor; and adjust the control value to maintain the mass flow rate of the gas at the predetermined set point; and temperature-measurement control logic configured to:

measure the input voltage of the thermal mass flow sensor to obtain a present input voltage;

calculate an adjusted input voltage by accounting for a component of the present input voltage that is dependent on the mass flow rate of the gas; and calculate the temperature of the gas based on the adjusted input voltage.

19. The mass flow controller of claim 18, wherein the temperature-measurement control logic is configured to compensate for variation, with temperature, of an output voltage of the thermal mass flow sensor under a zero-flow condition based on the calculated temperature.

* * * * *